United States Patent Office.

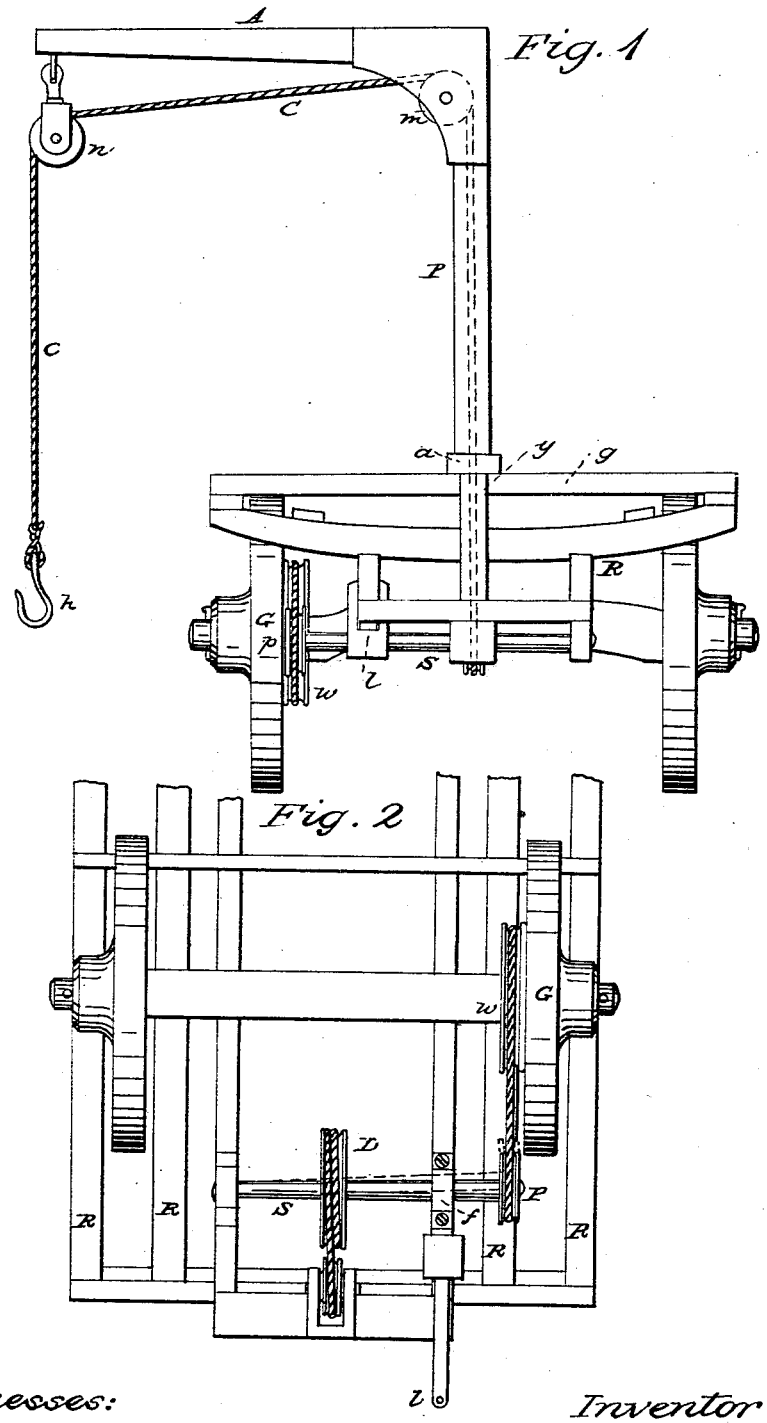

JONATHAN BULLIS, OF MACEDON, NEW YORK.

*Letters Patent No. 64,482, dated May 7, 1867.*

---

IMPROVEMENT IN HAY-LOADERS.

---

The Schedule referred to in these Letters Patent and making part of the same.

---

TO ALL WHOM IT MAY CONCERN:

Be it known that I, JONATHAN BULLIS, of Macedon, in the county of Wayne, and State of New York, have invented a new and useful "Hay-Loading Apparatus;" and I do hereby declare that the following is a full, clear, and exact description thereof, reference being had to the accompanying drawings, making part of this specification, in which—

Figure 1 is an elevation of the rear end of an ordinary wagon and hay-rack, having my invention attached.

Figure 2 is an inverted view of the rear portion of the same.

Like letters indicate like parts.

This invention will be understood by reference to the drawings and specification.

To enable others to make and use my invention, I will describe its construction and operation.

I propose to use a hollow king or axial post, P, for the derrick or crane, which may be made of wood or of common gas tubing, and is hung in the framework of the hay-rack R, as shown in the drawings, being supported vertically by the shoulder or collar *a*. This collar may be made separate, and attached to the post P by an ordinary set-screw, so that it may be raised or lowered on the post and thereby rendered adjustabe to different racks. The jib or arm A may be braced by an angle-iron, as shown, and is rigidly fixed to the top of the post, or the latter may be rigidly fixed to the rack and the arm made to swing upon it. The rope pulleys may be hung below the arm or above it, as may be desired. If the arm or jib is made to turn upon the post, the rope should lead into the top of the post. The drum D may be keyed to the shaft S, which is hung to the rack. The pinion or pulley *p*, if pulleys are used, may be keyed to the same shaft, in which case that end of the shaft may be hung in a sliding-box, *f*, in such a manner as to permit that pulley to be thrown toward or from the driving-pulley *w*, when it is to be thrown into or out of gear, these movements acting to loosen or tighten the band; or the pulley *p* may be hung loosely to the shaft and provided with an ordinary feathered or sliding clutch; or the drum may be hung loosely and the clutch applied to that end of the shaft. This drum-shaft is thrown into or out of gear by the lever *l*, which may be operated by a cord, one end of which is carried in the hand of the operator. The driving-pulley *w* may be attached to the hub or to the spokes of the wheel G by suitable clamping-bolts. There may be a cushion of felt, cloth, or rubber placed between it and the wheel to prevent it from chafing the latter. The relative size of the rope-drum D and pulleys *p* and *w* should be so arranged with relation to that of the wagon-wheel G as to cause the elevating fork to be raised to its extreme height by one turn or revolution of the said wheel G, or more or less if desired. Any ordinary "horse hay-fork" may be used on this elevator. The rope C passes from the drum D up through the hollow crane-post P, and through the pulleys *m* and *n* to the fork, which is attached to the hook *h*. There may be a spiral or other spring applied to the drum to prevent it from turning so easily as to run out a quantity of slack rope, which would have to be wound up before the moving wagon would begin to raise the fork and its load.

The attendant adjusts the fork in the hay and the team is then started, and the hay thereby raised to the desired height, when the team is stopped and the loader swings it in over the wagon and dumps it upon the load. At the same time the person who operates the fork below throws the rope-drum out of gear by a slight jerk of the cord attached to the lever or slide *l*, and the weight of the fork brings it down again, and the operation is repeated, if the hay is in windrows, but if it has been put up into cocks the team may be driven nearly to the next one before the fork is set in. If the hay is to be drawn into a barn with low doors the crane may be removed from the rack after the wagon is loaded, and left in the field, and replaced on its return. To facilitate this detachment the post P may be provided with a hanger-box at *y*, so made as to clasp the bar *g* of the rack by a clamping-bolt, and the rope-drum D so made as to slip off the shaft S by simply removing a key, or the rope may be unhooked from the drum. That portion of the rope running from the drum to the top of the post is entirely prevented from becoming knotted or twisted by being enclosed within the post. If the wagon-wheel G should be found to slip, it may be provided with several spurs, so made as to be clamped to the rim of the wheel while in use, and afterward removed.

What I claim as my invention, and desire to secure by Letters Patent, is—

The arrangement of the detachable hollow crane-post P, elevating cord C, drum D, and vibratory pulley-shaft S, with its sliding-box *f*, and lever or connection-bar *l*, and the pulley *p*, in connection with the driving-wheel *w*, attached to the ground-wheel G of the wagon, when the said parts operate in the manner and for the purposes shown and described.

JONATHAN BULLIS.

Witnesses:
WM. S. LOUGHBOROUGH,
P. T. TURNER.